United States Patent

Gupta et al.

[11] Patent Number: 5,851,585
[45] Date of Patent: Dec. 22, 1998

[54] IMPREGNATION OF PLASTIC SUBSTRATES WITH PHOTOCHROMIC ADDITIVES

[75] Inventors: Amitava Gupta, Bethesda, Md.; Ronald D. Blum; Venkatramani S. Iyer, both of Roanoke, Va.

[73] Assignee: Innotech, Inc., Roanoake, Va.

[21] Appl. No.: 970,579

[22] Filed: Nov. 14, 1997

Related U.S. Application Data

[62] Division of Ser. No. 669,738, Jun. 26, 1996, Pat. No. 5,789,015.

[51] Int. Cl.⁶ ..................................................... B05D 5/06
[52] U.S. Cl. ........................... 427/162; 252/586; 427/384; 427/430.1; 427/565
[58] Field of Search ........................... 252/586; 427/162, 427/384, 430.1, 565

[56] References Cited

U.S. PATENT DOCUMENTS

| | | | |
|---|---|---|---|
| 485,471 | 7/1892 | Maltman et al. | 524/719 |
| 3,519,462 | 7/1970 | Bristol et al. | |
| 3,562,172 | 2/1971 | Hisatake Ono et al. | 252/300 |
| 3,578,602 | 5/1971 | Hisatake Ono et al. | 252/300 |
| 3,988,274 | 10/1976 | Masuhara et al. | 260/29.7 |
| 4,116,862 | 9/1978 | Wippler | 252/300 |
| 4,190,621 | 2/1980 | Greshes | 264/1 |
| 4,215,010 | 7/1980 | Hovey et al. | 252/300 |
| 4,268,134 | 5/1981 | Gulati et al. | 351/163 |
| 4,286,957 | 9/1981 | Le Naour-Sene | 8/471 |
| 4,291,097 | 9/1981 | Kamada et al. | 428/412 |
| 4,342,668 | 8/1982 | Hovey et al. | 252/586 |
| 4,425,403 | 1/1984 | Taniguchi et al. | 428/331 |
| 4,544,572 | 10/1985 | Sandvig et al. | 427/44 |
| 4,556,605 | 12/1985 | Mogami et al. | 428/331 |
| 4,637,698 | 1/1987 | Kwak et al. | 351/163 |
| 4,693,962 | 9/1987 | Tamura et al. | 430/345 |
| 4,756,973 | 7/1988 | Sakagami et al. | 428/412 |
| 4,791,184 | 12/1988 | Nagai et al. | 526/323.2 |
| 4,792,224 | 12/1988 | Kwiatkowski et al. | 351/163 |
| 4,882,438 | 11/1989 | Tanaka et al | 548/407 |
| 4,909,963 | 3/1990 | Kwak et al. | 252/586 |
| 4,913,544 | 4/1990 | Rickwood et al. | 351/164 |
| 4,936,995 | 6/1990 | Kwiatkowski | 252/586 |
| 4,954,591 | 9/1990 | Belmares | 526/264 |
| 4,960,678 | 10/1990 | Tanaka et al. | 430/332 |
| 4,968,454 | 11/1990 | Crano et al. | 252/586 |
| 4,973,640 | 11/1990 | Matsuda et al. | 526/323.1 |
| 4,994,208 | 2/1991 | McBain et al. | 252/586 |
| 5,021,196 | 6/1991 | Crano et al. | 252/586 |
| 5,106,998 | 4/1992 | Tanaka et al. | 549/331 |
| 5,110,881 | 5/1992 | McBain et al. | 525/455 |
| 5,130,058 | 7/1992 | Tanaka et al. | 252/586 |
| 5,147,585 | 9/1992 | Blum | 264/1.4 |
| 5,178,800 | 1/1993 | Blum | 264/1.4 |
| 5,180,524 | 1/1993 | Casilli et al. | 252/586 |
| 5,185,390 | 2/1993 | Fischer et al. | 524/43 |
| 5,219,497 | 6/1993 | Blum | 264/1.4 |
| 5,246,989 | 9/1993 | Iwamoto et al. | 524/89 |
| 5,252,437 | 10/1993 | Suzuki et al. | 430/345 |
| 5,316,702 | 5/1994 | Gupta et al. | 264/1.7 |
| 5,349,065 | 9/1994 | Tanaka et al. | 546/15 |
| 5,366,668 | 11/1994 | Cuthbertson et al. | 264/1.8 |
| 5,405,557 | 4/1995 | Kingsbury | 264/1.7 |
| 5,474,715 | 12/1995 | Tagaya et al. | 252/586 |
| 5,523,030 | 6/1996 | Kingsbury | 264/1.7 |
| 5,531,940 | 7/1996 | Gupta et al. | |

FOREIGN PATENT DOCUMENTS

| | | |
|---|---|---|
| 0 134 633 | 3/1985 | European Pat. Off. . |
| 0 141 407 | 5/1985 | European Pat. Off. . |
| 0 245 020 | 11/1987 | European Pat. Off. . |
| 42 20 251 | 1/1993 | European Pat. Off. . |
| 0 708 164 | 4/1996 | European Pat. Off. . |
| 2 333 783 | 6/1974 | Germany . |
| WO85/02619 | 6/1985 | WIPO . |
| WO93/06160 | 4/1993 | WIPO . |
| WO94/04952 | 3/1994 | WIPO . |
| WO94/23928 | 10/1994 | WIPO . |
| WO95/15845 | 6/1996 | WIPO . |
| WO96/18921 | 6/1996 | WIPO . |

OTHER PUBLICATIONS

Abstract of JP 3002864, Toray Ind. Inc., Jan. 9, 1991.

*Primary Examiner*—Janyce Bell

[57] ABSTRACT

The present invention relates to new methods of impregnating plastic substrates with photochromic additives. By impregnating the plastic substrate in multiple impregnation steps under varying conditions, the concentration profile of two or more photochromic additive within the plastic substrate can be independently controlled. Methods are also provided for the distribution of a photochromic additive in a high boiling solvent and for increasing the glass transition temperature of a partially cured polymeric resin.

8 Claims, 2 Drawing Sheets

IMPREGNATION OF PLASTIC SUBSTRATES WITH PHOTOCHROMIC ADDITIVES

This is a division of U.S. application Ser. No. 08/669,738 filed Jun. 26, 1996 now U.S. Pat. No. 5,789,015.

FIELD OF THE INVENTION

The present invention relates to new methods of impregnating plastic substrates with photochromic additives.

BACKGROUND OF THE INVENTION

It is often desirable to impart photochromic properties to optical products which are used both in sunlight and in darkness. This allows such products to develop a dark tint that serves to reduce outdoor glare during exposure to sunlight, while also allowing them to turn clear when sunlight is not present. A combination of two or more photochromic additives, each with a colored state absorbing in a particular part of the visible wavelength range (400–750 NM) is typically used to obtain a desired tint.

Photochromic additives are generally incorporated into plastic substrates, such as ophthalmic lenses, by a process of diffusion. For example, the plastic substrate may be immersed in a solution or suspension of a photochromic additive or a mixture of additives at a particular temperature for a given period of time. Alternatively, the additives may be deposited on the surface of the plastic substrate and thermally diffused into the outer layers of the plastic substrate.

The extent to which the photochromic additives penetrate the plastic substrate generally increases with (a) increasing temperature, (b) increasing concentration of additives at the surface of the plastic substrate, and (c) increasing period of contact with the plastic substrate. The ease with which the photochromic additives are incorporated is also dependent upon the characteristics of the plastic substrate and of the photochromic additives themselves. For example, the extent of photochromic additive impregnation is frequently affected by the glass transition temperature of the plastic substrate. Moreover, the molecular size, melting point and solvent solubility of the photochromic additives all affect the ease of incorporation of the photochromic additives.

As a result of the above and other factors, in many cases, it is difficult to control individually the rate of incorporation of each photochromic additive into the plastic substrate. Sequential impregnation is frequently impractical, however, since the additive incorporated in the first step may diffuse outward or penetrate further inward during subsequent impregnation steps. As a result, the relative level of penetration of each individual photochromic additive into the plastic substrate is frequently poorly controlled, and the overall distance of penetration of the additives into the plastic substrate is poorly defined.

In other cases, the photochromic additives are not incorporated into the plastic substrate with sufficient uniformity and to a sufficient depth, resulting in poor performance and inadequate tint level.

SUMMARY OF THE INVENTION

The above and other drawbacks found in the prior art are overcome by the methods of the present invention.

According to a first embodiment of the present invention, a plastic substrate is impregnated with a photochromic additive in at least two impregnation steps. First, the plastic substrate is impregnated with at least a first photochromic additive. Then, the plastic substrate is impregnated with at least a second photochromic additive under conditions such that the ability of the first photochromic additive to diffuse within at least a portion of the plastic substrate during the second step is reduced relative to the first step.

One way to control the relative ability of the first photochromic additive to diffuse within the substrate between steps is by varying the temperature between steps, since higher temperatures result in greater substrate permeability. This effect is enhanced when one step is conducted at a temperature above the glass transition temperature of the substrate and the other step is conducted below the glass transition temperature. When varying temperature between steps, the plastic substrate may have a substantially constant glass transition temperature or a gradient in glass transition temperature.

Since some solvents achieve greater substrate swelling than others, and since greater substrate swelling increases substrate permeability, another way to control the relative ability of the first photochromic additive to diffuse within the substrate is by varying the solvent between steps. Highly crosslinked substrates are more resistant to swelling than less crosslinked ones. When varying solvent between steps, the plastic substrate may have a substantially constant cross link density or it may have a gradient in cross link density.

In another embodiment, the first photochromic additive is soluble in a first solvent and insoluble in a second solvent, and the first solvent is used in the first impregnation and the second solvent is used in the second impregnation.

According to another embodiment, a method of impregnating a plastic substrate with at least two photochromic additives in at least two impregnation steps is provided. Initially, the plastic substrate is impregnated using a first impregnation medium (e.g. solution or suspension) comprising first and second photochromic additives. Then the substrate is impregnated using a second impregnation medium comprising at least one of the first and second photochromic additives. At least one of the first and second photochromic additives in the second impregnation medium has a concentration different from that found in the first impregnation medium.

In yet another embodiment of the invention, a solution comprising one or more photochromic additives in a solvent is formed. After mixing the solution with a high boiling liquid, ultrasonic energy is applied to the mixture and the mixture is heated to a temperature sufficient to remove the solvent. The mixture is then preferably contacted with a plastic substrate by immersion of the substrate in the mixture, by applying a layer of the mixture to one or more surfaces of the substrate, and so forth. Preferred solvents include acetone, tetrahydrofuran, N-methylpyrrolidone, xylene, toluene, ethyl acetate, alcohols, hexane and acetonitrile. Preferred high boiling liquids are silicone oil, fluorosilicone oil and high boiling hydrocarbons.

Preferred photochromic additives for the practice of the present invention are spiro(indolino) naphthoxazines, spiro(indolino) pyridobenzoxazines, spiro(benzindolino) naphthoxazines and spiro(benzindolino) pyridobenzoxazines.

According to still another embodiment of the invention, an optical substrate is provided. At least a surface layer of the optical substrate comprises a partially cured polymeric resin. The optical substrate is then contacted with a liquid at an elevated temperature such that unreacted monomers and oligomers in the optical substrate diffuse from the optical substrate into the liquid. Concurrently, an increase in glass transition temperature of the optical substrate of at least 2° C. is achieved.

One advantage of the present invention is that it allows the relative concentration profiles of two or more impregnated photochromic additives to be controlled to an extent heretofore not known in the art, and thus achieves a broader range of tints from a particular set of photochromic additives.

Another advantage of the present invention is that it allows the incorporation of photochromic additives into plastic substrates with greater uniformity and to a greater depth, leading to better performing articles with darker tints.

These and other embodiments and advantages will become readily apparent to those skilled in the art after reading the detailed description to follow. Unless indicated to the contrary, each reference cited herein is hereby incorporated by reference in its entirety.

DETAILED DESCRIPTION OF THE INVENTION

Figure 1A:
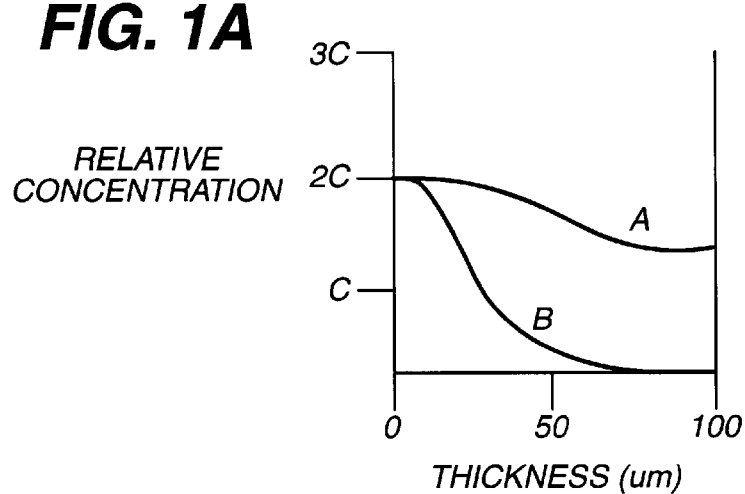
FIGS. 1A and 1B illustrate concentration profiles of two photochromic additives after each of two process steps.

Photochromic additives are substances that reversibly change in color and/or degree of light transmission when they are exposed to particular types of electromagnetic radiation (e.g., sunlight) and return to their original color and/or transmission status when the electromagnetic radiation source is removed or when the substance is exposed to radiation from a second electromagnetic radiation source, emitting at a wavelength different from the first. The absorption spectra of the photochromic additives are typically selected to give a grey, green, brown or blue appearance to the final product.

The substances endowed with photochromic characteristics known from the prior art are many and belong to several classes of inorganic and organic compounds, such as those described, e.g., in "Photochromism", G. H. Brown (Ed.), Vol. IV, from the Weisseberger Series "Techniques of Organic Chemistry", Wiley-Interscience, New York (1971), which is hereby incorporated by reference. Among the preferred photochromic additives for the practice of the present invention are those compounds belonging to the class of the spiro-indoline-type compounds. These compounds are capable of conferring photochromic characteristics to polymerized organic materials such as those disclosed, e.g., in the following patents: U.S. Pat. Nos. 3,562,172; 3,578,602; 4,215,010; 4,342,668; EP 146 135, WO 85/02619; EP 245 020; and in European patent applications publ. Nos. 134,633 and 141,407, each of which is hereby incorporated by reference. Such compounds include spiro(indolino) naphthoxazines, spiro(indolino) pyridobenzoxazines, spiro(benzindolino) naphthoxazines, and spiro(berizindolino) pyridobenzoxazines as well as a benzopyrans and naphthopyrans.

A wide range of photochromic articles capable of establishing at least a partial screen towards solar radiation in a reversible way can be obtained by establishing one or more photochromic additives within a plastic substrate. Such photochromic articles include photochromic ophthalmic lenses and photochromic sun filters, such as lenses for sunglasses, prescription lenses, contact lenses, glasses for cars or other transport vehicles, windows in the building sector, and so forth.

Such articles can be produced by means of surface impregnation, which is preferably obtained by contacting a plastic substrate with a solution or suspension which contains a photochromic additive at a suitable temperature and concentration. The photochromic additive can be introduced by immersion or by directly applying a solution or suspension containing the photochromic additive onto the plastic substrate by means of brushing, dripping, spraying, spinning and so forth.

According to one embodiment of the present invention, one or more photochromic additives is dissolved in a suitable solvent. Preferred solvents include acetone, N-methylpyrrolidone ("NMP"), tetrahydrofuran, xylene, toluene, ethyl acetate, hexane, acetonitrile, alcohols such as methanol, and so forth. The solvent is preferably selected such that the photochromic additives dissolve at room temperature, but the solution may be heated, for example, to 40° to 60° C., to facilitate faster dissolution. After dissolution of the photochromic additive in the solvent, a high-boiling liquid, preferably silicone oil such as polydimethyl siloxane, fluorosilicone oil or a high-boiling hydrocarbon is added and the mixture of high-boiling oil, solvent and photochromic additives is heated in an ultrasound bath to elevated temperatures, preferably 80° C. to 170° C., whereupon a plastic substrate is contacted with the mixture. An ultrasound bath is preferably utilized at this stage because it helps to disperse the photochromic additive particles and allows for deeper penetration of the photochromic additives into the plastic substrate. Use of ultrasound also ensures that the photochromic additive particles remain in fine suspension in the silicone oil, even though the mixture may be cooled for several hours. The rate,of increase in the temperature of the mixture is preferably a gradual one, so that the solvent gradually boils off while maintaining the photochromic additives in fine suspension.

Impregnation of a plastic substrate with the mixture produces an optical article in which the photochromic additive is distributed with greater uniformity and to a greater depth than is achieved by impregnation using a photochromic additive in a solvent.

Other embodiments of the present invention are directed to the independent control of the concentration profile of each photochromic species in the plastic substrate.

The level of change in optical transmission of a photochromic article that has been impregnated with a particular photochromic additive or set of additives depends upon a number of factors including the concentration of each additive, the screening effect exerted by one additive on others, and the thickness of the impregnated layer as measured by the extent of penetration of each additive. For example, assume that it is desired to impregnate an ophthalmic lens with a mixture of photochromic additives "A" and "B" and that B absorbs ultraviolet radiation in the wavelength range required for the activation of A. In this case, an impregnation procedure which deposits B predominantly on the surface, while allowing deeper penetration of A into the plastic substrate, will subject A to an ultraviolet screen formed by molecules of B, and will thus reduce the activation of A.

The present invention provides new procedures for incorporating photochromic additives into plastic substrates which allow the concentration profile of each photochromic species in the plastic substrate to be controlled. This control is achieved, for example, by changing the ability of one or more photochromic additives to diffuse (i.e., move) within the plastic substrate from one impregnation step to the next, allowing, for example, the one or more photochromic additives to remain substantially unchanged in at least a portion of the plastic substrate during subsequent steps.

The diffusivity of a photochromic additive at a specified temperature in a specified substrate is typically related to the melting point of the additive, its molecular mass, its solubility in the solvent/dispersant to be used, as well as the glass transition temperature, crosslink density and permeability of the substrate. For example, lower melting point additives and additives of lower molecular weight generally diffuse more rapidly into a given plastic substrate at a given impregnation temperature. The diffusivity of the photochromic additive can also be enhanced by using a liquid which dissolves the photochromic additives.

The plastic substrate softens, and thus becomes more permeable to additives, at temperatures above the glass transition temperature. As a result, the glass transition temperature ($T_g$) can be used to regulate the permeability of the plastic substrate at a given temperature, with penetration of the photochromic additives being significantly enhanced at temperatures above $T_g$. The $T_g$ also affects the switching rate of the photochromic additives, with higher $T_g$ materials resulting in reduced switching rates.

The glass transition temperature is typically controlled by changing the composition of the resin used to form the substrate. For example, if two resins are combined, with the first resin having a higher $T_g$ than the second resin, then the $T_g$ of the blend can be increased by increasing the relative amount of the first resin. For more information on this topic, see Odian, *Polymer Science*, Wiley Interscience, 1992, which is hereby incorporated by reference in its entirety.

According to a further embodiment of the present invention, the polymer resin used to form at least a portion of the plastic substrate is only partially cured such that it contains a residual level of unreacted monomer and oligomers. These unreacted small molecular weight species depress the glass transition temperature of the material in which they reside. The plastic substrate is then immersed into a liquid bath which is a poor swelling agent for the partially cured substrate at a temperature significantly higher than the glass transition temperature of the final product. The residual unreacted species diffuse out of the matrix into the bath, causing pores or voids to develop and raising the glass transition temperature, typically in the range of 2°–10° C. The bath temperature is preferably significantly higher than the glass transition temperature of the material after diffusion of unreacted species. The rise in glass transition temperature modifies the dynamic of the photochromic activation and deactivation processes as well as the level of darkening, i.e., the dynamic range of the optical transmission achieved at a particular temperature. At the same time, the matrix becomes more permeable to photochromic additives due to the creation of voids.

The cross link density can also be controlled to regulate the permeability of the plastic substrate. For example, an increase in cross link density results in a decrease in the permeability of the layer to additives, as well as swelling by common organic solvents such as acetone or hexane. Swelling the surface of the plastic substrate accelerates the permeation of the photochromic additives into the substrate and helps reduce processing time. Cross link density is typically controlled by controlling the degree of functionality of the resin components. For example, monomers with a greater number of reactive functional groups generally result in polymers with greater cross link density. Such monomers include bisphenol A diacrylate, ethoxylated hexame diol diacrylate and polyoxyethylene diacrylate or methacrylate with a molecular weight of 400 to 600. For further information on monomer formulations, see, e.g., Odian, *Polymer Science*, Wiley Interscience, 1992.

It is also possible to enhance diffusion by only partially curing the plastic substrate prior to the diffusion of additives. After diffusion, the cure of the plastic substrate is completed to increase the degree of cross linking.

The monomer formulations previously discussed are typically photopolymerized using photoinitiators such as bis-dimethoxybenzoyl trimethylpentyl phosphine oxide (BAPO, available from Ciba Geigy Corp), 1-Hydroxy cyclohexyl phenyl ketone (Irgacure 184, available from Ciba Geigy Corp), or 2-hydroxy, 2-methyl, 1-phenyl propane (Durcure 1173, available from Ciba Geigy). Alternatively the monomer formulation may be thermally polymerized using an organic peroxide, hydroperoxide, percarbonate, peracetate, or an azo derivative as a thermal polymerization initiator. Examples are benzoyl peroxide, 2,2' azobisisobutyronitrile, or diisopropyl percarbonate.

Antioxidants, such as thiodiethylene bis(hydrocinnamide) (Irganox 1035, available from Ciba Geigy Corp) or bis (1,2,2,6,6,-pentamethyl-4-piperidyl sebacate) (Tinuvin 292, available from Ciba Geigy Corp), may also be included in the monomer formulation.

In various embodiments of the invention, the plastic substrate to be impregnated can be homogeneous throughout, can comprise an outer layer of the polymer to be impregnated, or can comprise multiple outer layers of polymers to be impregnated. In the latter case, the composition of each layer can be varied to create continuous or discrete gradients in glass transition temperature (such as the profile shown in FIG. 3A), cross link density, level of cure, and so forth.

In any of these embodiments, a mold can be used to form the plastic substrate. For example, a mold can be entirely filled with an uncured resin that will ultimately form a homogeneous plastic substrate.

Alternatively, the surface of a mold can be coated with an uncured resin. The coated mold can then be subjected to a partial cure (although both a complete cure and the absence of a cure are also contemplated) to form a coated mold. This step can be repeated such that the coating on the mold comprises two or more layers. The coated mold can then be filled with an additional resin to form the plastic substrate with one or more surface layers. As an example, the coated mold can be included in a conventional mold assembly that also comprises an accessory mold and a gasket. The space between the coated mold and the accessory mold can then be filled with resin, and the entire assembly cured.

In other embodiments, the plastic substrate is provided using a pre-existing body, either by casting one or more plastic layers on the surface of the body using a mold, or by casting one or more plastic layers on the body by spraying, dip coating, brushing, flow coating, spin coating, curing the resin in situ in a resin bath, using photolithography and so forth. In such embodiments, the surface of the body may be pretreated before casting the plastic layer on it. Techniques for pretreatment can be found, for example, in U.S. Pat. No. 5,316,702, the disclosure of which is hereby incorporated by reference in its entirety. The body can be formed from a polymeric material, glass, or metal, preferably from a polymeric material.

As an example, a first layer of resin can be provided on a body by spin coating and the resin at least partially cured. A second layer of resin can then be spin coated on the first layer, followed by partial cure, and so forth, until a desired number of layers is achieved.

Once the plastic substrate is impregnated with an additive or additives, it is preferably overcoated with an outer barrier layer. The purpose of the outer barrier layer may be to provide an oxygen barrier and/or reduced porosity, in order to minimize escape of additives loaded into the plastic substrate and decrease the oxygen permeability. Such hardcoat layers preferably have a high cross-link density and a $T_g$ of more than about 65° C.

The outer barrier layer may provide desirable optical properties, such as reduced reflection levels. The outer barrier layer may be designed to change surface hardness, scratch resistance, surface smoothness, or impact properties of the lens.

Preferably, the outer barrier layer is substantially a non-UV-blocking layer. By blocking as little UV radiation as possible, the photochromic additive activation is compromised as little as possible.

Such a layer may or may not be the outermost layer of the lens, but may simply be "outer" with respect to the plastic substrate.

The outer barrier layer may change the refractive power of the lens as a whole, it may result in a negligible change in the refractive power of the lens, or it may change the refractive power of the lens in part, as when providing an add power zone.

The outer barrier layer may be a hard coat layer such as those described in U.S. Pat. No. 4,544,572, which is hereby incorporated by reference in its entirety. The outer barrier layer may comprise a material like that used to form the optical substrate, preferably with a final hard coat layer, and so forth.

Depending on the specific application, the outer barrier layer may be cast either with the use of molds, or it may be cast without molds using, for example, the techniques described above. The outer barrier layer may be polymerized thermally, photochemically (as disclosed in U.S. Pat. Nos. 5,178,800, 5,147,585 and 5,219,497 which are hereby incorporated by reference in their entireties) or both.

Other state-of-the-art methods of overcoating may also be employed, such as those commonly employed to put on a scratch resistant layer on the surface of the lens.

Figure 1B:
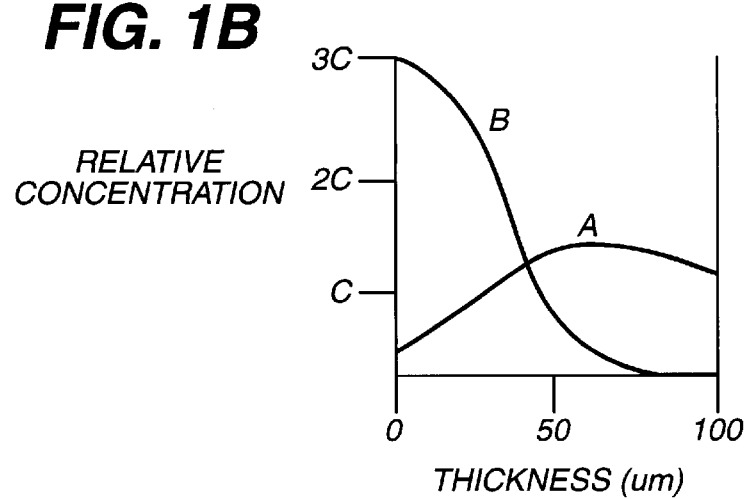

Turning now to several additional specific embodiments of the invention, FIGS. 1A and 1B illustrate concentration profiles of two photochromic additives after each of two process steps. A 100 μm layer of a polymeric matrix on a body is designated by the x axis, with body being found at x=100 μm. In this example, the diffusivity of A is greater than that of B. After a first diffusion step at 150° C. with relative concentrations of A and B at 2C, the concentration profile is approximately that shown in FIG. 1A.

After a second diffusion step at 100° C. with relative concentrations of A and B at 1C and 3C, respectively, the concentration profile is approximately like that shown in FIG. 1B. In this manner, B is distributed near the surface of the polymeric matrix, while A is distributed at a greater depth. From this example, it is clear that a near infinite range of concentration profiles (with a corresponding range of colors) can be established within a plastic substrate by using photochromic additives of different diffusivities, by varying the temperature of impregnation and/or by varying the photochromic additive concentrations.

Figure 2:
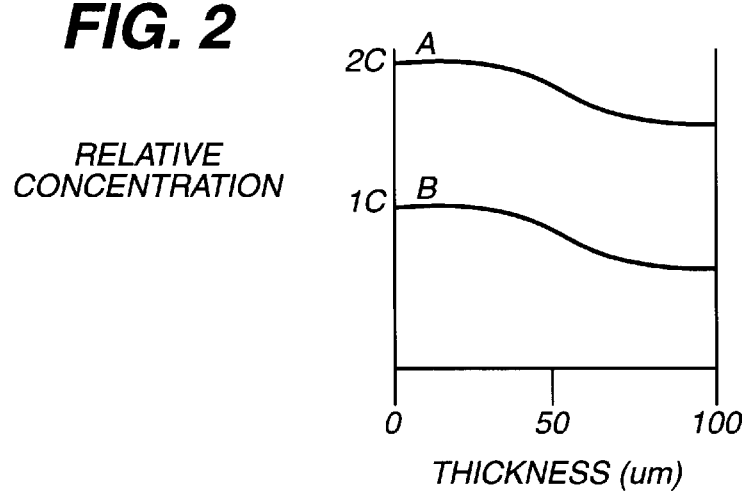
FIG. 2 illustrates the concentration profiles of two photochromic additives after completion of two process steps.

As an additional example, an inert liquid (i.e., a liquid which does not plasticize the surface of the lens) can be used to form suspensions of two photochromic additives A and B for use in impregnation of a plastic substrate. In this case the melting points of the photochromic additives, their molecular masses and their solubilities are preferably determined. The lower melting additive generally diffuses more rapidly into the plastic substrate at any given temperature. Moreover, this difference in diffusivity is magnified at temperatures between the two melting points, particularly if the glass transition temperature of the surface layer of the lens is adjusted to be within the two melting points as well. Therefore, the glass transition temperature of the outer layer of the plastic substrate is adjusted so that it falls between the two melting points. A 100 μm thick layer of plastic substrate on a lens body (found at x-100 μm) is impregnated with the first, higher melting additive A at a relative concentration of 2C and a temperature that is (1) near or above its melting point and (2) above the glass transition temperature of the plastic substrate. The plastic substrate is then impregnated with the second, lower melting additive B at a relative concentration of 1C and a temperature lower than the temperature of the first impregnation such that it is (1) below the melting point of the first additive A, (2) above the melting point of the second additive B and (3) above the glass transition temperature of the plastic substrate. In this way, the second additive can be separately diffused into the plastic substrate, without significantly affecting the distribution of the first additive, resulting in a concentration profile like that of FIG. 2.

Using techniques such as those previously described, a gradient of cross link densities or glass transition temperatures can be established near the surface of the plastic substrate. Such property gradients can be used to individually control the distance of penetration of various photochromic additives into the lens. In this way, variations in property gradient can be used to adjust the relative concentration profiles of two photochromic additives within the lens so as to control screening of one component by another. For example, a gradient of increasing glass transition temperature from the surface may be used to allow a much deeper penetration of one photochromic additive relative to another.

Figure 3A:
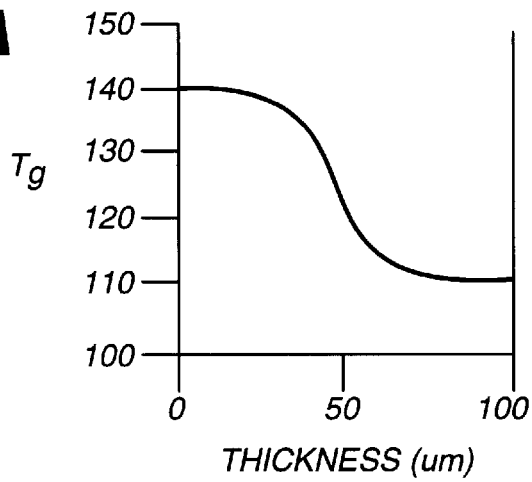
FIG. 3A illustrates the glass transition temperature profile of a polymeric matrix.

FIG. 3A illustrates the glass transition temperature of a thin layer of polymeric matrix layer versus thickness, x. In this case, the polymeric matrix is 100 μm thick with a change in $T_g$ from 140° C. to 110° C. occurring at x=50 μm. The polymeric matrix is provided on a body, which lies at x=100 μm.

Figure 3B:
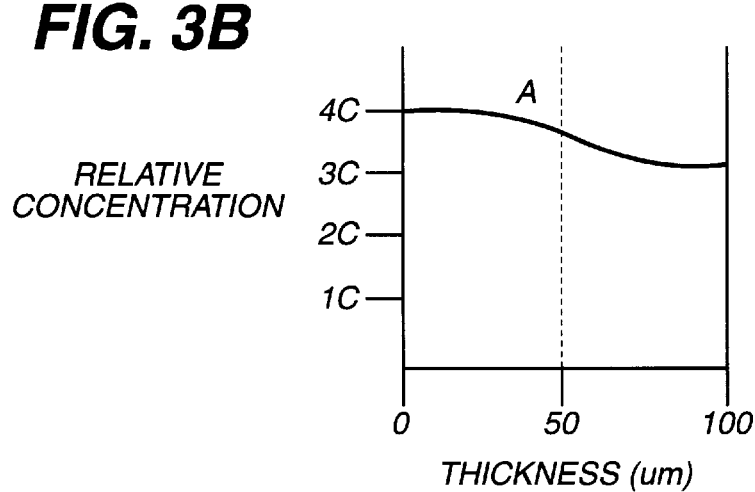
FIGS. 3B and 3C illustrate concentration profiles of two photochromic additives after each of two process steps.
Figure 3C:
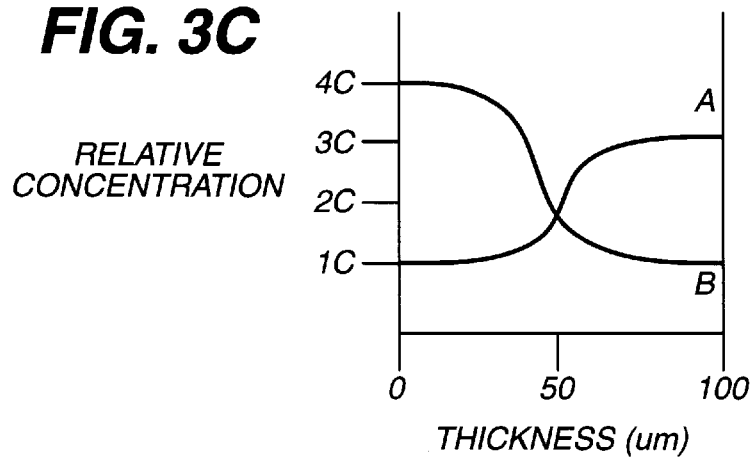

FIGS. 3B and 3C illustrate concentration profiles of two photochromic additives A and B after each of two process steps. In the first process step, the matrix is immersed in A at a concentration of 4C at 150° C. At this temperature, both regions of the matrix are above their respective $T^g$'s. Hence, after a given period, A is distributed throughout the matrix approximately as shown in FIG. 3B.

In the following process step, the matrix is immersed in a solution of B at a concentration of 4C and at a temperature of 120° C. No A is present in solution. At this temperature, the left-hand region is below its $T_g$, markedly decreasing the effective diffusivity of A and B, while the right-hand region is above its $T_g$ enhancing diffusivity. After a given period, A and B are distributed approximately as shown in FIG. 3C.

In addition to providing the ability to control relative screening of photochromic additives and hence achieve a wide range of colors, this technique can be used to more closely match the switching rates of A and B to one another. For example, if A has a faster switching rate than B in a given material, the distribution of A in a higher $T_g$ material relative to that of B will slow the switching rate of A relative to B. This helps to maintain a constant color during switching.

The following examples are merely illustrative of the process of incorporating photochromic additives into a plastic substrate, without limiting in any way the scope of the claims.

EXAMPLES

Example 1

An ophthalmic lens made of polymerized bisallyl carbonate (CR-39™) of prescription +2.00D, diameter 75 mm and front curvature 6.18D is placed in a mold of matching front curvature (6.14D). 0.60 ml of a photopolymerizable resin formulation containing bisallyl carbonate (40% w/w), polyethylene glycol (M.W. 400) diacrylate (7.5%), phenoxyethyl methacrylate (50%) and a photoinitiator (1-hydroxy-cyclohexyl-phenyl ketone, 2.5%) was added to the mold prior to the placement of the lens. The lens spreads out the resin layer to form a liquid layer of uniform thickness of 0.18 mm. The lens assembly is then exposed to ultraviolet radiation in a curing chamber in order to form a layer of desired glass transition temperature and cross link density. The glass transition temperature, as measured by thermomechanical analysis is 28.7° C.

A first suspension of photochromic additives in high boiling silicone oil is prepared by adding the following photochromic additives to 1 liter of silicone oil: spiro(2H-indole-2,3'-(3H)naphtho(2,1-b)(1,4) oxazine)-1,3dihydro-1,3,3-trimethyl-6'-(1-piperidinyl) (hereinafter "A"), m.p. 230° C.; 3,3diphenyl-3H-naphtho (2,1-b)pyran (hereinafter "B"), m.p. 158° C., 1.5 g; and 1,3dihydro-1,3,3,5,6pentamethyl-spiro(2H-indole-2,3-(3H)naphtho-(2,1-b)-(1,4)oxazine (hereinafter "C"), mp 140° C., 3.0 g. A second suspension of C only is prepared by adding 3.0 g of C to 1 liter of silicone oil. In all cases, the suspensions are stirred thoroughly at room temperature. The lens is immersed in the first suspension at 130° C. for 35 minutes, then in the second suspension at 95° C. for 10 minutes. The lens is cleaned in soap and water, and dried. The lens is clear indoors, with luminous transmission being 85%, and turns a dark blue-gray outdoors, with luminous transmission being 30–40%.

Example 2

An ophthalmic lens made of polymerized bisallyl carbonate (CR-39™) of prescription +2.00D, diameter 75 mm and front curvature 6.18D is placed in a mold of matching front curvature (6.14D). 0.60 ml of a photopolymerizable resin formulation containing bisallyl carbonate (40% w/w), polyethylene glycol (M.W. 400) diacrylate (7.5%), phenoxyethyl methacrylate (50%) and a photoinitiator (1-hydroxy-cyclohexyl-phenyl ketone, 2.5%) was added to the mold prior to the placement of the lens. Placement of the lens spreads out the resin layer to form a resin layer of uniform thickness of 0.18 mm. The lens assembly is then exposed to ultraviolet radiation in a curing chamber to form a layer of desired glass transition temperature and cross link density. The glass transition temperature, as a measured by thermomechanical analysis is 28.7° C.

A suspension of photochromic additives in acetone is prepared by adding the following photochromic additives to about 100 ml of acetone: 1,3,3,4,5-Pentamethyl -spiro-(indolino-2,3'-(3H)-naphtho-(2,1-b)-(1,4)-oxazine(A): 3.0 g; 1,3,3-Trimethyl-6'-piperidino-spiro -(indolino-2,3'-(3H)-naptho-(2,1-b-)-1,4)-oxazine (B), 2.0 g; 1,1'-diphenyl-(4,5)-naphthoxazole (C), 1.5 g. The acetone solution is then heated in the temperature range of 30° C.–40° C. for a short period of time. On heating and stirring the photochromic additives dissolve gradually. Then this solution is added to silicone oil and the resulting mixture is gradually heated to temperatures of 130° C.–150° C. in an ultrasound bath where the lens is immersed in the mixture for a period of time. For a given level of tint, the time of immersion is inversely proportional to the temperature of the mixture. On completion of the impregnation process, the lens is removed from the mixture, cooled to room temperature, and then the lens is cleaned in soap and water and dried. The lens is clear indoors, luminous transmission being 85%, and turns a dark blue-gray outdoors.

Example 3

A photocurable resin formulation is provided which contains bisallyl carbonate (26% w/w), ethoxylated aliphatic triacrylate (24%), ethoxylated bisphenol A diacrylate (42%), polyoxy methylene diacrylate (6%), and Irgacure 184 (2%). A monofocal lens, made by polymerizing a formulation of bisphenol A dimethacrylate, styrene and bisallyl carbonate, of power –2.00D and front curve equal to 6.14D is selected for this study. The front surface of the lens is abraded by placing the lens, convex surface up, in a metal container and adding enough sand to the container such that the sand does not reach the front surface of the lens, even at the edge. Then the container is moved back and forth using a reciprocating motor drive at the rate of 150 cycles per minute for 3 minutes. The lens is cleaned and placed on a single vision glass mold of matching curvature fitted circumferentially with two spacers 180 degrees apart, each of 200 microns in thickness. The space between the mold and the lens is filled with the photocurable resin formulation. This formulation is then photocured using a temperature ramp beginning at 25° C. and ending at 67° C. over 50 minutes, with the temperature increasing monotonically during the whole period. The glass transition temperature of the matrix layer is measured to be 36.6° C. using dynamic mechanical analysis. The modified lens is then immersed in silicone oil (polydimethoxy silicone, mol. wt. 900) at 130° C. for 30 minutes. The lens is then thoroughly cleaned by scrubbing with soap and water. The glass transition temperature is measured again and found to be 40.4° C. The lens is then immersed in a photochromic bath as in Example 2.

We claim:

1. A method comprising:
   forming a solution comprising one or more photochromic additives in a solvent;
   forming a mixture comprising said solution and a liquid, the liquid having a boiling point higher than the boiling point of the solvent;
   applying ultrasonic energy to said mixture; and
   heating said mixture to a temperature sufficient to remove said solvent.

2. The method of claim 1, further comprising contacting said mixture with a plastic substrate.

3. The method of claim 2, wherein said mixture is contacted with said plastic substrate by immersing said plastic substrate in said mixture.

4. The method of claim 2, wherein said mixture is contacted with said plastic substrate by applying a layer of said mixture to one or more surfaces of said plastic substrate.

5. The method of claim 1, wherein said solvent is selected from the group consisting of acetone, N-methylpyrrolidone, tetrahydrofuran, xylene, toluene, ethyl acetate, alcohols, hexane and acetonitrile.

6. The method of claim 1, wherein said liquid is selected from the group consisting of silicone oil, fluorosilicone oil, and hydrocarbons.

7. The method of claim 1, wherein said photochromic additives are selected from spiro(indolino)naphthoxazines, spiro(indolino)pyridobenzoxazines, spiro(benzindolino)naphthoxazines and spiro(benzindolino)pyridobenzoxazines.

8. The method of claim 1, wherein said temperature ranges from about 80° C. to about 170° C.

* * * * *